United States Patent Office 3,208,253
Patented Sept. 28, 1965

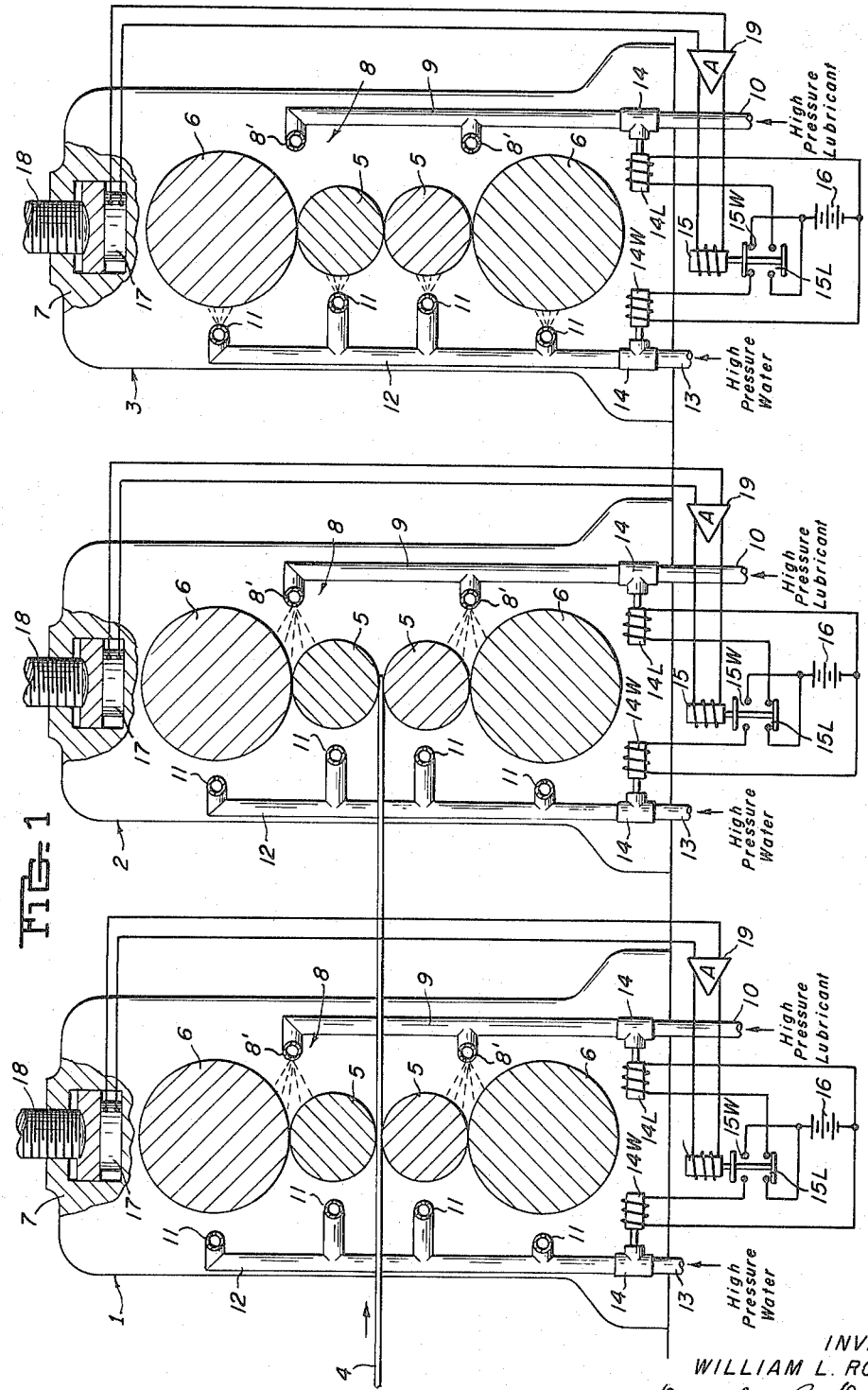

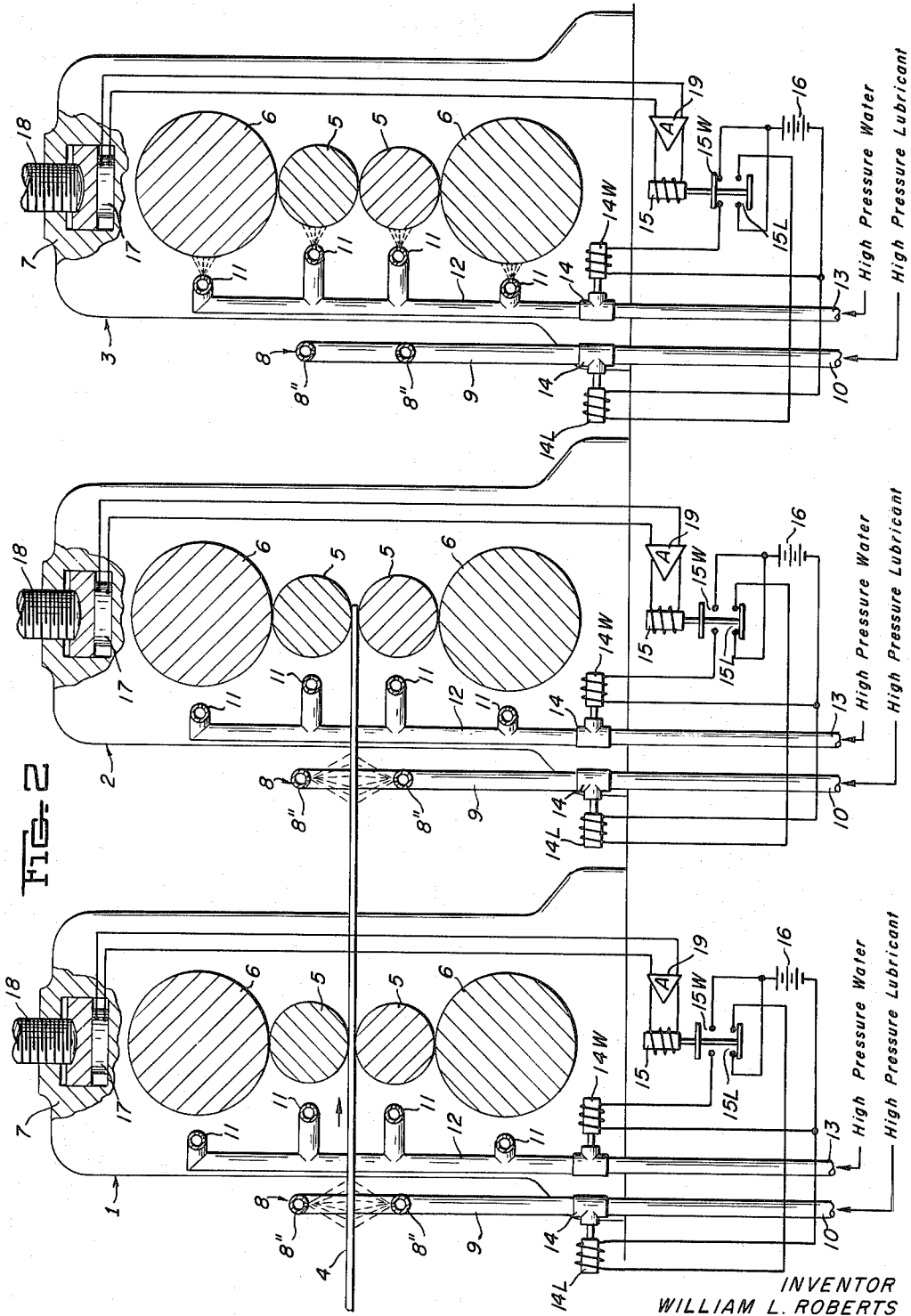

3,208,253
CONTROL OF ROLLING MILL LUBRICANT
William L. Roberts, Murrysville, Pa., assignor to United States Steel Corporation, a corporation of New Jersey
Filed May 10, 1963, Ser. No. 279,657
5 Claims. (Cl. 72—21)

This invention relates to apparatus and method for automatically controlling alternate application of rolling lubricant and non-lubricating roll coolant during metal reduction in rolling mills. More particularly the invention provides a system for sequentially timing rolling lubricant application in relation to workpiece roll entry, and for control of cooling water application to any rolls momentarily free of a workpiece.

While the invention is particularly applicable to the rolling of strip and sheet products, it is also intended for use in other rolling operations where lubrication and cooling control, as taught herein, may be similarly advantageous.

In rolling mills, other than continuous mills such as continuous-strip mills, there are periods when a workpiece is not present in some of the roll stands, for example during the threading of the mill. During these periods it is advantageous to discontinue lubricant application, to prevent wastage, as well as for other reasons set forth hereinafter, and apply a non-lubricating coolant, preferably water, to the rolls.

The invention, in addition to providing for the foregoing timely lubrication termination and application of cooling water to the rolls, so sequentially times the shut-off of roll coolant and the renewed application of lubricant that lubricant application is not commenced until the workpiece has just fully entered the roll bite. This latter consideration is of importance, since premature application of lubricant to the workpiece or the rolls may cause slippage, with consequent difficulty or failure of the workpiece to enter the roll bite. In the case of strip rolling, non-entry of the strip into the roll bite results in cobbles, a serious difficulty in rolling operations. Once a bite has been achieved, prompt lubricant application is desirable and is accomplished by the invention.

The invention contemplates application of rolling lubricant, either to the workpiece or the rolls, or both. However, in hot-mill applications the lubricant is preferably applied applied to the rolls.

The invention will be more particularly described in conjunction with its incorporation in a strip-rolling mill, three stands of which are depicted in operational sequence in the drawings, wherein:

FIGURE 1 is a vertical section through three stands of a strip-rolling mill which incorporate means for the alternate application of lubricant and water to the rolls; and FIGURE 2 is similar to FIGURE 1 except for provision for application of lubricant to the workpiece.

With further reference to FIGURES 1 and 2, roll stands 1, 2, 3, which typify finishing stands of a strip-mill, are depicted in operational sequence with workpiece 4. In the example depicted, each stand comprises two work-rolls 5 and two backup rolls 6, in a mill housing 7.

Lubricant spray nozzles 8, designated 8', for rolls 5, 6 application and 8" for workpiece 4 application, are mounted on manifold 9 supplied with lubricant under pressure through inlet 10.

Water spray nozzles 11 are mounted on manifold 12 in such position as to direct their output upon rolls 5, 6, to cool them. Water under pressure is supplied through inlet 13.

Fluid flow is preferably controlled electrically. Conventional solenoid-operated valves 14–L and 14–W, provide on-off control for lubricant and water, respectively.

Valves 14, which are of the normally closed type, are actuated by conventional double-pole relay 15, which by means of contact sets 15–L and 15–W, together with suitable circuitry, is capable of selectively inserting a voltage source 16 into circuit with the corresponding lettered lubricant and water valves, to cause them to open. In relay 15, contacts 15–L are normally open and contacts 15–W are normally closed.

Relay 15, in turn, is responsively connected to a load-sensing device 17, located beneath roll-pressure adjusting screw 18. The load sensing device conveniently comprises a load cell, such as typified by that of United States Patent 2,050,106, Aug. 4, 1936, E. T. Long et al., particularly since such a device may already be installed or desired for additional purposes. The signal from the load cell is amplified by conventional amplifier 19. Other means of determining the moment of entry of a workpiece into the roll bite will suggest themselves to those skilled in the art.

In further description of operation of the lubricant/coolant application system as a whole, attention is invited particularly to stand 2, where a workpiece 4 is shown as just having fully entered the roll bite. Immediately upon the workpiece reaching this position load sensing device 17 signals relay 15 of the workpiece entry, causing closure of contact set 15–L, which had until then been open under a no-load condition as shown at stand 3. The closure of the 15–L contacts completes a circuit including voltage source 16 and solenoid operated valve 14–L, thus promptly commencing lubricant flow from inlet 10, through manifold 9 and nozzles 8. This flow will continue so long as a workpiece remains in the stand, as depicted in stand 1.

Stand 3 represents the status of lubricant and water application when no workpiece is present in that particular stand. Upon a workpiece leaving the stand, load sensing device 17 discontinues its load signal to relay 15 whereupon the relay contacts return to their normal position, the contacts 15–L open and contacts 15–W closed, thus opening the circuit which had included voltage source 16 and valve 14–L, permitting valve 14–L to return to its normally closed position with resultant termination of lubricant flow. Simultaneously, the flow of water commences through nozzles 11, from manifold 12 and inlet 13, by reason of the closure of relay contacts 15–W which places voltage source 16 in circuit with valve 14–W, thereby moving it from its normally closed position to its open position. The repetitive sequence of operations will become apparent by consideration of the foregoing discussion.

The positioning of the water spray nozzles 11, in relation to the rolls, may be as shown, or varied to suit individual preferences of those skilled in the art, since their satisfactory positioning to obtain cooling will be apparent.

Also, with respect to the lubricant discharge nozzles 8, there is considerable latitude as to their positioning with respect to the rolls and workpiece. However, their positioning generally as shown, is preferred.

It will be noted that nozzles 8', for roll application, are located on the exit side of a stand, and are directed generally toward the contact lines of rolls 5, 6. This positioning is of advantage in insuring against premature lubrication at the working surfaces, as it permits the workpiece to be well into the roll bite before lubricant applied at those points on the workroll circumferences reaches the working surfaces.

Similar considerations apply to the nozzle 8" placement relative to lubricant application to workpiece 4, where the nozzles should be so located as to permit commencement of lubrication with a minimum of unlubricated working, but still permit the rolls to obtain a good bite before lubrication commences. A location on the entry side at a distance from the roll working surfaces, as dictated by the foregoing considerations, is preferred.

Simultaneous application of lubricant to both the rolls and workpiece may be made if desired. Also, the cycle may optionally exclude either the application of water or lubricant.

Other modifications will be obvious to those skilled in the art to which this invention appertains, and I do not wish to be held to the exact details of construction shown and described.

I claim:

1. A rolling-mill stand having means adapted to apply rolling lubricant in sequential timing in relation to workpiece roll entry, said means comprising means for rolling lubricant application, means adapted to produce a signal upon entry of a workpiece into the rolls, and on-off flow control means for said lubricant adapted to operate responsively to said signal means, whereby lubricant application is caused to commence substantially simultaneously with said workpiece having entered the bite of said rolls.

2. The combination of claim 1 in which the means for lubricant application direct said lubricant against the exit side of the workrolls.

3. The combination of claim 1 in which the means for lubricant application direct said lubricant against the workpiece as it approaches the entry side of the workrolls.

4. A rolling-mill stand, having means adapted to alternately apply rolling lubricant and roll-cooling water in sequential timing in relation to workpiece presence in the bite of the rolls of said stand, said means comprising means for rolling lubricant application, means for roll-cooling water application, means adapted to produce a signal upon entry of a workpiece into the rolls, on-off flow control means for said lubricant adapted to operate responsively to said signal means, and on-off flow control means for said water adapted to operate responsively to said signal means, whereby lubricant application is caused to commence substantially simultaneously with said workpiece having entered the bite of said rolls and said water application is caused to commence upon said workpiece leaving said rolls.

5. A method of rolling metal in a rolling-mill stand comprising the steps of introducing a workpiece into the bite of the rolls of said stand, commencing application of rolling lubricant substantially simultaneously with said workpiece having entered the bite of said rolls, and discontinuing the application of said lubricant and commencing the application of roll-cooling water immediately upon the workpiece leaving the roll bite.

References Cited by the Examiner

UNITED STATES PATENTS

| | | | |
|---|---|---|---|
| 1,978,894 | 10/34 | Clark | 80—41 |
| 2,272,368 | 2/42 | Duffy | 80—1.2 |

CHARLES W. LANHAM, *Primary Examiner.*

MICHAEL V. BRINDISI, *Examiner.*